(12) United States Patent
Cadek et al.

(10) Patent No.: US 8,059,389 B2
(45) Date of Patent: *Nov. 15, 2011

(54) COMPOSITE CONTAINING CARBONIZED BIOPOLYMERS AND CARBON NANOTUBES AND METHOD OF MAKING THE COMPOSITE

(75) Inventors: Martin Cadek, Augsburg (DE); Mario Wachtler, Ulm (DE); Encarnacion Raymundo-Pinero, Orleans (FR); Francois Beguin, Olivet (FR)

(73) Assignees: SGL Carbon SE, Wiesbaden (DE); Centre National de la Recherche Scientifique, Cedex (FR); L'Universite d'Orleans, Cedex (FR)

(*) Notice: Subject to any disclaimer, the term of this patent is extended or adjusted under 35 U.S.C. 154(b) by 127 days.

This patent is subject to a terminal disclaimer.

(21) Appl. No.: 12/541,999

(22) Filed: Aug. 17, 2009

(65) Prior Publication Data

US 2010/0033902 A1 Feb. 11, 2010

Related U.S. Application Data

(63) Continuation of application No. PCT/EP2008/051169, filed on Jan. 31, 2008.

(30) Foreign Application Priority Data

Feb. 16, 2007 (EP) .................................. 07003318

(51) Int. Cl.
*H01G 9/00* (2006.01)
(52) U.S. Cl. ........ 361/502; 361/503; 361/504; 361/512; 361/523; 361/528

(58) Field of Classification Search .................. 361/502, 361/503–504, 509–512, 523–529, 516–519; 423/445 R, 460
See application file for complete search history.

(56) References Cited

U.S. PATENT DOCUMENTS

| | | | | |
|---|---|---|---|---|
| 5,552,337 | A * | 9/1996 | Kwon et al. | .................. 438/396 |
| 5,797,072 | A * | 8/1998 | Ehara et al. | .................. 399/174 |
| 6,031,711 | A | 2/2000 | Tennent et al. | |
| 7,061,749 | B2 | 6/2006 | Liu et al. | |
| 7,532,454 | B2 | 5/2009 | Plee et al. | |
| 2009/0052117 | A1 * | 2/2009 | Cadek et al. | .................. 361/503 |

FOREIGN PATENT DOCUMENTS

WO 2005088657 A2 9/2005

OTHER PUBLICATIONS

International Search Report dated Jun. 5, 2008.
Written Opinion.
F. Beguin, et al., "A Self-Supporting Electrode for Supercapacitors Prepared by One-Step Pyrolisis of CNT/PAN Blends," Advanced Materials, No. 17, 2005, pp. 2380-2384, XP002449649.

* cited by examiner

*Primary Examiner* — Nguyen T Ha
(74) *Attorney, Agent, or Firm* — Laurence A. Greenberg; Werner H. Stemer; Ralph E. Locher (57) ABSTRACT

A composite suitable as a charge-storing material for electrochemical capacitors contains carbon nanotubes and a carbonaceous materiel. The carbonaceous material is the carbonization residue of a biopolymer or seaweed rich in heteroatoms. Wherein the carbonization residue of the biopolymer or seaweed is electrically conductive and has a heteroatom content as detected by XPS of at least 6%.

25 Claims, 6 Drawing Sheets

FIG. 4 carbonized Lessonia nigrescens on carbon nanofibers

FIG. 5A carbonized Lessonia Nigrescens on multi-walled carbon nanotubes

FIG. 5B

COMPOSITE CONTAINING CARBONIZED BIOPOLYMERS AND CARBON NANOTUBES AND METHOD OF MAKING THE COMPOSITE

CROSS-REFERENCE TO RELATED APPLICATION

This is a continuation, under 35 U.S.C. §120, of copending international application No. PCT/EP2008/051169, filed Jan. 31, 2008, which designated the United States; this application also claims the priority, under 35 U.S.C. §119, of European patent application No. 07 003 318.8, filed Feb. 16, 2007; the prior applications are herewith incorporated by reference in their entirety.

BACKGROUND OF THE INVENTION

Field of the Invention

The present invention relates to a composite containing carbonized biopolymers or carbonized seaweeds and carbon nanotubes, which can be used as an electrode material for electrochemical capacitors.

Electrochemical capacitors are devices which store electrical energy by separation of charged species in an electrical double layer at the electrode/electrolyte interface. The electrodes of such a capacitor have to be electrically conductive and electrochemically inert over a wide range of potential. Furthermore, the capacitive behavior must not significantly degrade, even over a large number of charging/discharging cycles. Activated carbons are the most widely used electrode materials for electrochemical capacitors because of their high surface area and high electronic conductivity.

U.S. Pat. No. 7,061,749 discloses an electrochemical capacitor wherein the electrodes contain a composite made of activated carbon and single-walled carbon nanotubes. The composite is prepared by a method containing the steps of (i) forming a precursor composite from a suspension containing single-walled carbon nanotubes and polymer, (ii) heat treating the precursor composite in a non-oxidizing environment to form a composite containing carbonaceous polymer and carbon nanotubes, and (iii) activating the composite of carbonaceous polymer and carbon nanotubes. Optionally, prior to carbonization the precursor composite is heated to a temperature typically in the range of about 200 and 300° C. in an oxidative environment to stabilize the polymer.

The polymer component of the precursor composite is a polymer, copolymer or mixture thereof capable of being carbonized and activated such that the resulting material is primarily carbon with high surface area. Among others, polyacrylonitrile and its copolymers, and phenolic resins are suitable polymers.

The other component of the composite is constituted of single-walled carbon nanotubes. Two kinds of carbon nanotubes are known, single-walled ones and multi-walled ones. However, U.S. Pat. No. 7,061,749 teaches to use solely single-walled carbon nanotubes, because they are considered generally stronger and more conductive and to have considerably higher available surface area per gram of carbon than multi-walled carbon nanotubes. The single-walled carbon nanotubes can be used as synthesized or after purification. Synthesis and purification of single-walled carbon nanotubes are known in the art.

The concentration of carbon nanotubes dispersed in the polymer is selected based on the properties desired for the end use application. Generally, the carbon nanotube-to-polymer weight ratio can be in the range of about 1:99 and about 99:1. Preferably, the carbon nanotube-to-polymer weight ratio is in the range of about 20:80 and about 80:20.

The activation step in the above-described method is a treatment to increase the porosity and surface area of the carbonized or pyrolyzed material. Activation can also affect the surface morphology and functionality. Typically, activation is done at high temperature in the presence of an oxidizing environment like carbon dioxide or steam, or through the action of a chemical activating agent like potassium hydroxide, zinc chloride, sodium carbonate or phosphoric acid. Although the use of the composites as electrodes without activation after the carbonization is not generally excluded, it is emphasized that higher performance is achieved when the carbonized polymer-nanotube composite is subjected to an activation treatment.

Without activation, the specific capacitance of an electrode containing a composite of a carbonized polymer and single-walled carbon nanotubes at a voltage of 0.4 V in alkaline electrolyte (6 mol/l KOH) is 34 F/g at a discharge current of 0.001 A, 30 F/g at 0.005 A and 28 F/g at 0.01 A. The strong dependence of the capacitance on the current is explained by the assumption that at high currents, the small size pores appear to be not as readily available for the formation of the electrical double layer. Thus, the total effective available area of the electrical double layer at high charging-discharging rates is less than at lower charging-discharging rates.

With activation treatment, at a voltage of 0.4 V in 6 mol/l KOH, a capacitance in the range between 90 and 167 F/g at a discharge current of 0.001 A, between 67 and 117 F/g at 0.005 A and between 60 and 107 F/g at 0.01 A was obtained. Obviously, the activation treatment leads to a significant increase of the capacitance, which might be attributed to increase of the electrode surface area by increased porosity. However, the dependence on the current is even more pronounced.

Electrodes containing a composite of carbonized polyacrylonitrile and multi-walled carbon nanotubes were studied by F. Beguin et al. (Advanced Materials 2005, 17, 2380-2384). In the preparation of the composite, the thermal stabilization of the polyacrylonitrile before carbonization and the subsequent activation were omitted. It was found that even after carbonization at 700° C. still a significant amount of nitrogen is present in the composite. For a composite with an initial composition containing weight fractions of 30% multi-walled carbon nanotubes and 70% polyacrylonitrile, in the carbonized state the weight fraction of nitrogen was between 7 and 9%.

The capacitance was significantly influenced by the composition of the composite (weight relation between PAN and carbon nanotubes) and the pyrolysis conditions (temperature and duration). The highest electrode capacitance (100 F/g) was obtained for a composite with an initial composition containing weight fractions of 30% multi-walled carbon nanotubes and 70% polyacrylonitrile which was carbonized during 180 minutes at 700° C. The capacitance decreased when the pyrolysis temperature was increased or the composition was modified (either decrease or increase of the fraction of carbon nanotubes) or the pyrolysis time was changed (either extended or reduced). This influence on the capacitance was explained by a synergy between the template effect of the multi-walled carbon nanotubes on the nanotexture of the composite and the pseudo-faradaic contribution of the nitrogen functionality in the carbonized polyacrylonitrile. The favorable texture of the composite allowed for fast charging/discharging without significant lost of capacitance.

However, further increase of the electrode capacitance is desirable for practical application of electrochemical capacitors.

SUMMARY OF THE INVENTION

It is accordingly an object of the invention to provide a composite containing carbonized biopolymers and carbon nanotubes and a method of making the composite which overcomes the above-mentioned disadvantages of the heretofore-known devices and methods of this general type.

With the foregoing and other objects in view there is provided, in accordance with the invention, a composite, containing carbon nanotubes; and a carbonaceous material. The carbonaceous material is a carbonization residue of a biopolymer or seaweed rich in heteroatoms. The carbonization residue is electrically conductive and has a heteroatom content as detected by XPS of at least 6%.

The present invention provides a composite containing a carbonaceous material and carbon nanotubes, which when used as an electrode material for electrochemical capacitors are capable to provide for an increased gravimetric and volumetric capacitance. The carbonaceous material in the composite is the carbonization residue of a biopolymer rich in heteroatoms, wherein the carbonization residue of the biopolymer is electrically conductive and has a heteroatom content of at least 6%.

More specifically, the gravimetric capacitance (capacitance per unit weight of charge-storing material in one electrode) of electrodes containing a composite according to the present invention is at least 200 F/g, and the volumetric capacitance (gravimetric capacitance multiplied with the density of the charge-storing material) is at least 200 F/cm$^3$. Preferably, the gravimetric capacitance is at least 230 F/g, and more preferably at least 250 F/g, and the volumetric capacitance (gravimetric capacitance multiplied by the density of the electrode material) is at least 220 F/cm$^3$.

Furthermore, a method to obtain such a composite is provided.

The composite of the present invention is obtained by a method containing the steps of dispersing carbon nanotubes within a precursor biopolymer or seaweed, thus forming a precursor composite containing carbon nanotubes and a biopolymer or seaweed, and carbonization of the precursor composite under inert atmosphere at a temperature in the range between 550 and 1000° C., preferably between 600 and 900° C. without any subsequent activation treatment.

Other features which are considered as characteristic for the invention are set forth in the appended claims.

Although the invention is illustrated and described herein as embodied in a composite containing carbonized biopolymers and carbon nanotubes and a method of making the composite, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Those biopolymers and seaweeds disclosed in European patent application No. 06 002 103.7 are suitable for the preparation of composites according to the present invention.

It is a prerequisite that the biopolymer or the seaweed (both commonly referred to as precursors) has a high content of heteroatoms. Heteroatoms have to be understood as atoms different from carbon and hydrogen. Preferred kinds of heteroatoms are oxygen and nitrogen, because functional surface groups containing nitrogen or oxygen atoms are able to undergo reversible electrochemical redox reactions.

It is further necessary that the precursor can be transferred into an electrically conductive carbonaceous material with a significant content of heteroatoms remaining in the carbonaceous material. With the biopolymers or seaweeds disclosed in the European patent application No. 06 002 103.7, carbonization usually spreads over a wide temperature range with several decomposition stages at different temperature levels associated with weight loss. At the lowest temperature levels, thermally induced split-off processes like dehydration and decarboxylation occur, while at higher temperature levels further thermal degradation of the polymer takes place. To obtain a carbonaceous material with the desired content of heteroatoms, it is important to carry out the carbonization of the precursor at a temperature below the highest temperature level of thermally induced weight loss of the biopolymer. The suitable temperature range can be estimated by thermogravimetric analysis.

In contrast to the carbonization behavior of the biopolymers or seaweeds described above there are other oxygen-rich biopolymers like cellulose which upon carbonization do not form an oxygen-rich (i.e. heteroatom-rich) carbonaceous material, because they decompose in a narrow temperature range. For instance cellulose decomposes within the small temperature range between 300° C. and 350° C., resulting in a char with a small oxygen content (below 5 atom %) although the precursor cellulose has an oxygen content between 40 and 50 atom %. Those biopolymers are not suitable precursors for the present invention.

The heteroatom content of the carbonization residue of biopolymers and seaweed suitable for the present invention is at least 6 atom % (detected by XPS technique). Some preferred precursors form a carbonaceous material with an oxygen content of at least 6 atom %, or a sum of the contents of nitrogen and oxygen of at least 8 atom %. This amount of heteroatoms was found to create a significant pseudocapacitive contribution. On the other hand, it has to be emphasized that the heteroatom content must not be so large that the electronic conductivity is detrimentally influenced. Indeed, the electronic conductivity of the carbonaceous material is at least 0.2 S/cm. In contrast, conventional partially carbonized materials like those obtained from controlled partial carbonization of cellulose are known to have very poor electronic conductivity (about $10^{-8}$ S/cm at a carbon content in the range of 75-80% by weight, see British patent GB 1,118,626).

It was found that several biopolymers which are contained in seaweeds, especially in red or brown seaweeds or agarophytes, are very suitable precursors. Examples of such biopolymers are alginic acid, alginate salts, agar and carrageenan (iota and kappa). The polymers might be extracted from the seaweeds before carbonization. Alternatively, the raw seaweeds containing such polymers can be used directly as precursor without previous extraction of the biopolymer. Thus, by carbonization of carrageenan-rich red seaweeds like Hypnea Musciforme or of alginate rich brown seaweeds like Lessonia Nigrescens or of agar-rich seaweeds, carbonaceous material suitable as electrode material for electrochemical capacitors can be produced. This route is very favorable for economic reasons, since the extraction process is omitted. Another suitable precursor biopolymer is chitin.

Carbon nanotubes obtained by any of the methods known in the art can be used.

The term carbon nanotubes is understood to include single-walled carbon nanotubes, multi-walled carbon nanotubes and carbon nanofibers and their mixtures.

Carbon nanofibers are often confused with multi-walled carbon nanotubes. The term carbon nanofiber is used for a hollow or a solid carbon fiber with several microns in length and diameters varying from tens of nanometers to hundreds of nanometers. However, carbon nanofibers do not have the classical texture of multi-walled carbon nanotubes where the walls of the tube are parallel to the longitude fiber axis. Carbon nanofibers usually are formed from a mixture of several forms of carbon: cylindrical layers, layers of graphite stacks at various angles, layers of amorphous carbon. They are produced at the industrial scale by catalytic chemical vapor decomposition (CVD) using catalyst particles e.g. iron, and carbon containing gases e.g. ethylene. The differences to the CVD-production method for carbon nanotubes are the absence of substrates, a lower production temperature and the higher production yields.

Most preferably multi-walled carbon nanotubes are used. For instance, multi-walled carbon nanotubes can be obtained by catalytic decomposition of acetylene over supported cobalt particles. Further details of this method can be found in J. Nanosci. Nanotech. 2002, vol. 2, p. 481, and in the U.S. Pat. No. 7,094,385 disclosing a process for the mass production of multi-walled carbon nanotubes. Multi-walled carbon nanotubes obtained by the catalytic method are preferably purified to remove any residue of the catalyst. Suitable purification methods are known in the art.

To obtain the precursor composite, carbon nanotubes are homogeneously dispersed into the precursor. When a raw seaweed is used as the precursor, the seaweed is milled prior to dispersion of the carbon nanotubes.

Preferably the carbon nanotubes are added to the precursor in such an amount that the weight fraction of carbon nanotubes in the composite after carbonization of the precursor is at least 5%, preferably between 5 and 10%. To adjust the weight fraction of carbon nanotubes to the desired range, the weight loss upon carbonization has to be taken into account. The weight loss of the biopolymer or seaweed can be determined from thermogravimetric studies of the carbonization behavior of the precursor without carbon nanotubes added. When composites containing a pure biopolymer and purified carbon nanotubes are carbonized, it can be reasonably assumed that no consumption of the carbon nanotubes occurs during the carbonization process. On the other hand, when the composite contains raw seaweeds, it cannot be ruled out that the seaweeds contain substances like metal cations like $Ca^{2+}$, $Na^+$ and/or $K^+$ which catalyze the oxidation of carbon, thus leading to a partial consumption of the carbon nanotubes. In this case, only a nominal weight fraction of the carbon nanotubes can be quoted, based on the carbonization weight loss of the seaweed and the weight of the carbon nanotubes dispersed therein. However the consumption of the carbon nanotubes upon carbonization of seaweed-based composites is by no means complete, since there is a significant effect on the capacitance.

In order to preserve a certain amount of heteroatoms in the carbonaceous material, the carbonization of the composite containing the precursor and carbon nanotubes dispersed therein is carried out substantially under the same conditions as described in the European patent application No. 06 002 103.7.

Thus the carbonization is preferably carried out at a temperature below the highest temperature level of thermally induced weight loss of the precursor. The suitable temperature range can be estimated by thermogravimetric analysis. Usually, the precursor composites are carbonized at temperatures between 550° C. and 1000° C. under inert atmosphere for a few hours, mostly around 3 hours. Preferred is a carbonization at a temperature in the range of 600 to 900° C.

The carbonization is done in a single stage process without prior thermal stabilization, without subsequent activation and without addition of any chemical activation agent.

After carbonization of the precursor in the presence of the nanotubes, the carbonaceous material is spread over the surface of the carbon nanotubes and covers them. Therefore, the composite has a texture which is determined by the texture of the carbon nanotubes.

In the case of multi-walled carbon nanotubes the mesoporous texture of the multi-walled nanotubes is also present in the composite. Compared to the same carbonaceous material without nanotubes, the presence of multi-walled carbon nanotubes leads to an increase of the pore volume attributable to the mesopore range (pore diameter between 2 and 50 nm). In contrast, the pore volume in the range of micropores (pore diameter between 0.7 and 2 nm) and ultramicropores (pore diameter below 0.7 nm) is only slightly changed or even decreased. The increase of the fraction of the mesopores is beneficial for the application in electro-chemical capacitors, because mesopores can be easily accessed by the electrolyte, thus improving the access to the electrode/electrolyte interface of the micropores.

The significant contribution of mesoporosity introduced by the multi-walled carbon nanotubes can facilitate the transport of fluids. This opens a plurality of additional application fields beside electrochemical capacitors, for instance those related to the fields of gas adsorption and gas storage, separation or purification of gases (for example air) and purification of water etc.

In the case of carbon nanofibers, which have a bigger diameter and are not entangled like the multi-walled carbon nanotubes, the composite does not have such a pronounced mesoporosity. However, surprisingly it was found that the texture of such composites, wherein the carbonaceous material is spread over carbon nanofibers, also remarkably facilitates ion diffusion and capacitive charging/discharging.

The composites can be formed into electrodes by casting a mixture of the composite and a suitable binder on current collectors or by pressing a mixture of the composite and a suitable binder into the desired shape and assembling with current collectors. An additional percolation agent like carbon black is not necessary. Electrode production from activated carbon and assembling of electrochemical capacitors containing such electrodes is known in the art, and the same technique is used for the composites of the present invention. Thus no further details regarding electrode manufacturing need to be given.

Electrochemical capacitors are obtained by assembling two electrodes with a suitable electrolyte. In one embodiment, the capacitor is a symmetric capacitor. This means that both electrodes have the same composition. Alternatively, two electrodes with different composition are combined with an electrolyte to form an asymmetric capacitor.

By comparison with electrodes made from the same precursors without carbon nanotubes, it can be shown that the presence of carbon nanotubes, especially multi-walled carbon nanotubes and carbon nanofibers has a beneficial effect on several electrochemical parameters.

The equivalent series resistance which can be determined from the high frequency limit of the impedance spectrum decreased due to the presence of carbon nanotubes. The series resistance contains the contributions of all Ohmic resistances in the electrochemical system, i.e. the electrode material itself, the electrolyte and all electronic contacts. The decrease of the series resistance can be related to the high electronic conductivity of the carbon nanotubes, which is preserved within the composites.

Interestingly, impedance spectroscopy revealed that the presence of either multi-walled carbon nanotubes or carbon nanofibers provokes also a decrease of the equivalent distributed resistance governing the low frequency region of the impedance spectrum. This parameter is determined by the diffusion of the ions into and out of the electrode material. The decrease of the equivalent distributed resistance shows that both the multi-walled carbon nanotubes and the carbon nanofibers are able to create favorable conditions for the ion diffusion in the composite. More specifically, for the composites containing multi-walled carbon nanotubes, it can be assumed that it is the increased fraction of mesopores that facilitates diffusion.

With an acidic aqueous electrolyte like sulfuric acid, the gravimetric capacitance of electrodes containing the composite of the present invention is above 200 F/g at a voltage of 1.2 V and a current density up to 1 or even 10 A/g (equal to a current of 0.08 A). This is significantly higher than the capacitance data reported in U.S. Pat. No. 7,061,749 for electrodes containing a composite having single-walled carbon nanotubes and a carbonized synthetic polymer like polyacrylonitrile (see above).

Figure 1:
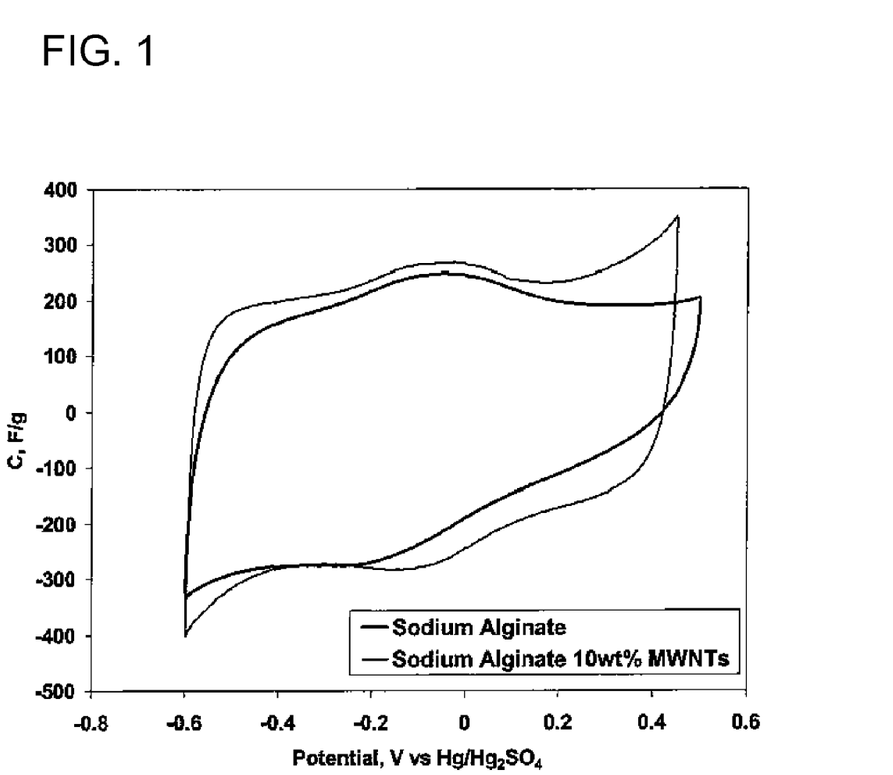
FIG. 1 is a graph showing a cyclic voltammogram of an electrode containing a composite according to the invention (recorded in three-electrode technique)

In part, this increase can be attributed to a large pseudocapacitive contribution originating from the heteroatoms in the carbonaceous material which form a component of the composite of the present invention. The pseudocapacitive behavior of these carbonized biopolymers and carbonized seaweed was disclosed in the European patent application No. 06 002 103.7. Indeed, even without the presence of any carbon nanotubes, the gravimetric capacitance of the carbonaceous material is higher than the values reported in U.S. Pat. No. 7,061, 749 or at least comparable. The pseudocapacitive behavior is preserved in the composites of the present invention, as can be seen from the humps in the cyclic voltamogram (FIG. 1). In case a purely electrostatic behavior, the cyclic voltamogram would exhibit a nearly rectangular shape.

Figure 2A:
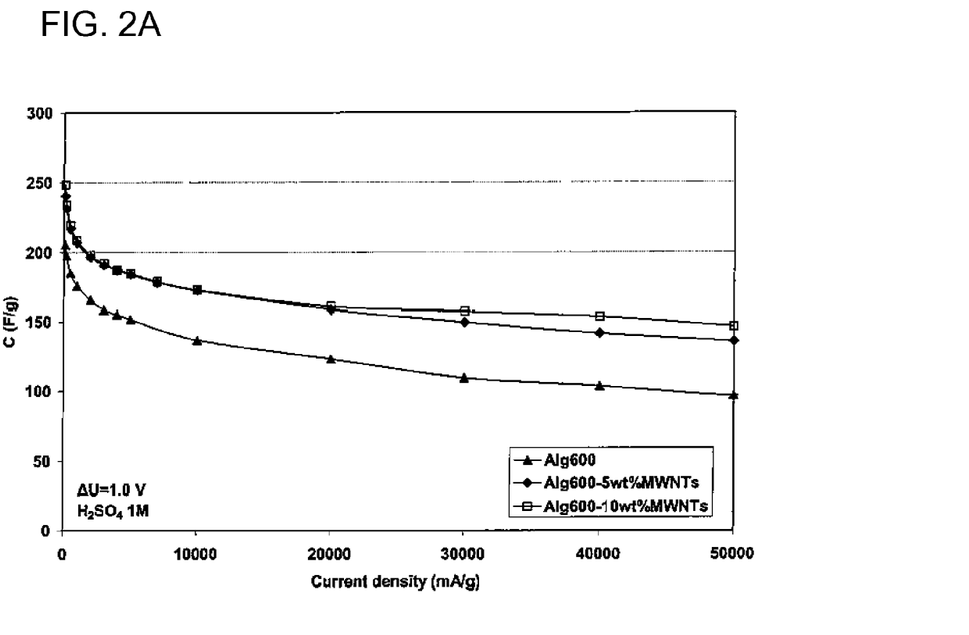
FIGS. 2A and 2B are graphs showing a gravimetric capacitance of capacitors equipped with electrodes containing composites according to the invention as a function of the current density.
Figure 2B:
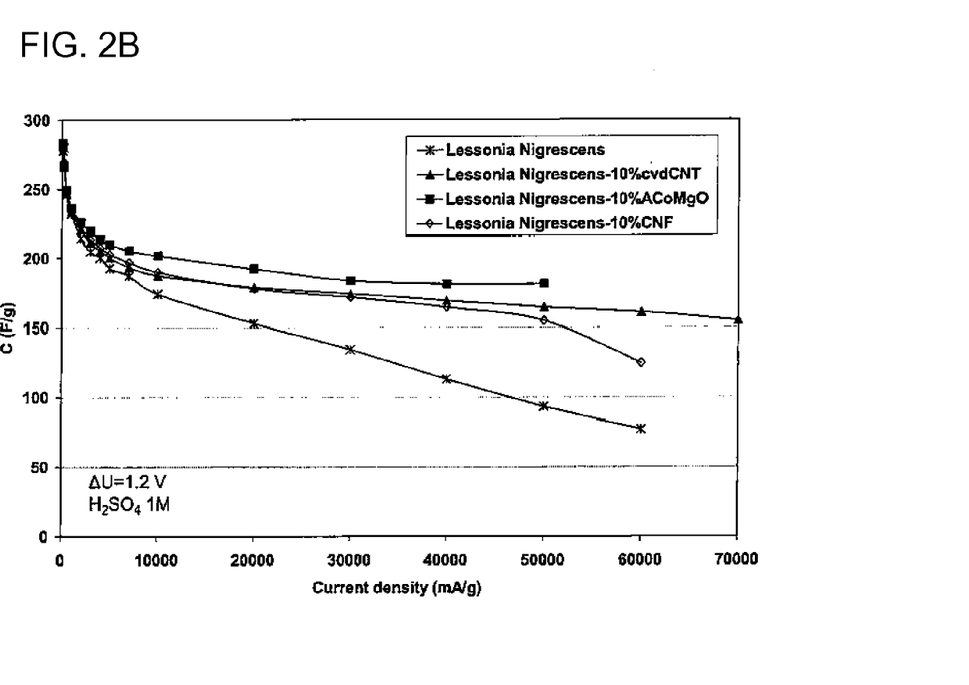
Figure 3A:
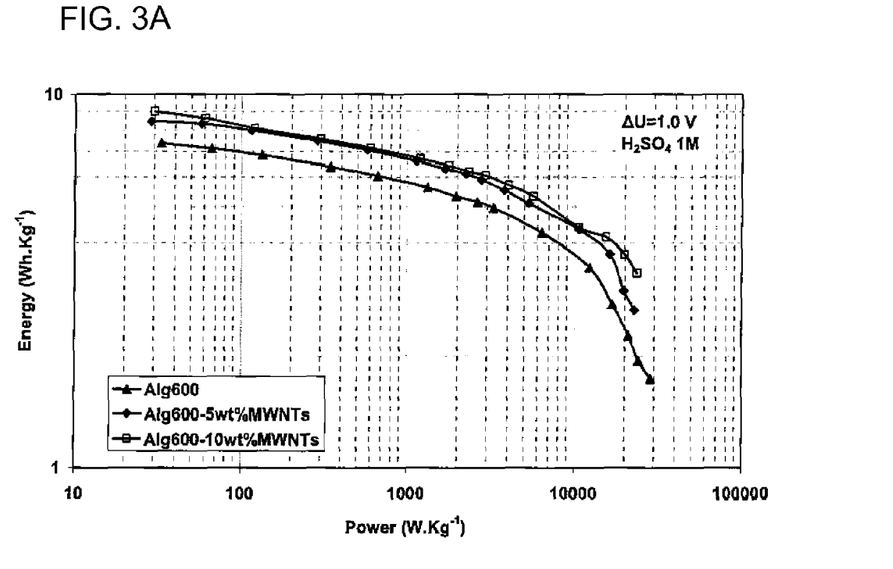
FIGS. 3A and 3B are graphs showing Ragone plots of capacitors equipped with electrodes containing the composites according to the invention.
Figure 3B:
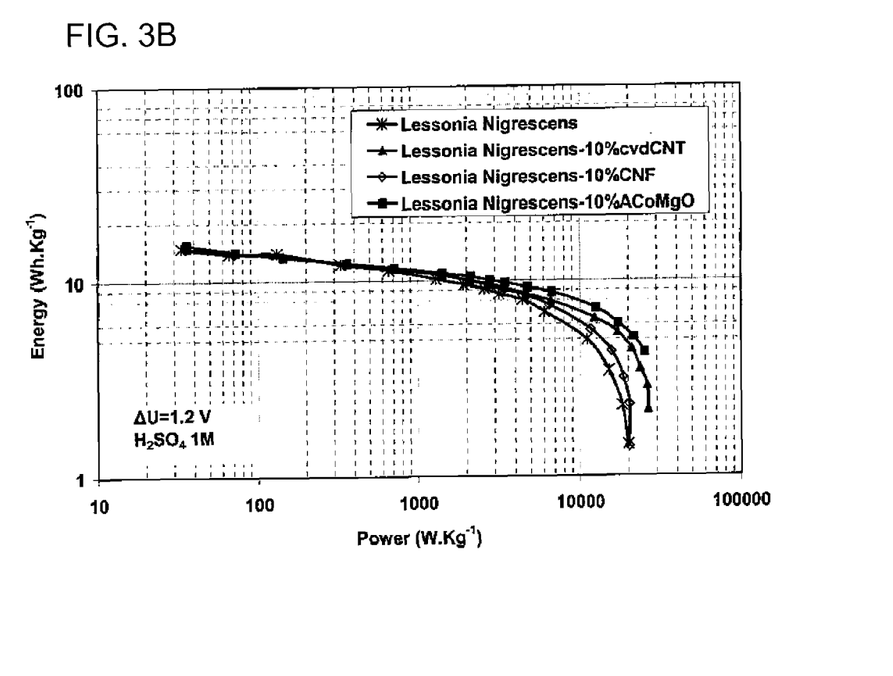

However, the presence of carbon nanotubes leads to a further increase of the capacitance and to a pronounced reduction of the dependence of the capacitance on the current density. In contrast, presence of an equal amount of a state of the art percolation additive like carbon black does not have a significant effect on the capacitance. The increase affected by the multi-walled carbon nanotubes or carbon nanofibers is ascribed to the facilitation of the ion diffusion into and out of the composite, which allows for fast charge/discharge. Therefore, the utilization of the electrode/electrolyte interface at high current densities is increased and the dependence of the capacitance on the current density is reduced (FIGS. 2A and 2B). This in turn leads to an increase of the energy density available at high power densities (FIGS. 3A and 3B).

In contrast to the prior art composites containing carbonized PAN and multi-walled carbon nanotubes (F. Beguin et al., Advanced Materials 2005, 17, 2380-2384), a significantly lower weight fraction of carbon nanotubes (around 10% instead of 30%) is sufficient to obtain a significantly higher capacitance. Due to the high density of the composites, which is in the range of 0.8 to 1 g/cm$^3$, a volumetric electrode capacitance above 200 F/cm$^3$ is achieved.

Upon repeated charge/discharge cycling, the capacitance decreased only slightly (at most 16% after 10,000 to 20,000 cycles). It is assumed that the presence of carbon nanotubes improves the resiliency of the electrode material during charge/discharge cycling and therefore enhance the cycle life of the electrode.

The composites of the present invention are suitable as electrode materials for electrochemical capacitors with aqueous as well as with organic electrolytes. In aqueous electrolytes, the maximum cell voltage is around 1.0 to 1.4 V.

The beneficial effects of the presence of multi-walled carbon nanotubes were observed with both kinds of precursors, pure biopolymers and raw seaweeds. However, in the case of raw seaweed as precursor, a somewhat higher nominal weight fraction of carbon nanotubes was necessary to bring about a significant effect. This can be ascribed to the partial consumption of the carbon nanotubes upon carbonization in the presence of catalytically active components containing metallic cations which are present in the raw seaweed.

With carbon nanofibers instead of multi-walled carbon nanotubes, a comparable increase of the capacitance was observed, although there was no significant effect on the porosity.

EXAMPLES

Preparation of the Composites

In order to evaluate the influence of the precursor, a precursor composite containing a pure biopolymer (commercially available sodium alginate) and another precursor composite containing a raw seaweed (Lessonia Nigrescens) were prepared in the following manner. Multi-walled carbon nanotubes (MWNT) obtained by the method described in J. Nanosci. Nanotech. 2002, vol. 2, p. 481 and in U.S. Pat. No. 7,094,385 were dispersed into sodium alginate (Aldrich) or milled Lessonia Nigrescens. In each precursor, the weight percentage of the multi-walled carbon nanotubes was fixed to be either 5% or 10% in the final composite, considering the carbonization yield of the precursor.

In the same way a precursor composite was prepared from Lessonia nigrescens with a weight percentage of 10% carbon nanofibers (CNF).

For carbonization, the composites were heated with a heating rate of 10 K/min until a temperature of 600° C. was reached. This temperature was kept at this temperature during 3 hours under nitrogen gas flow.

For comparison, samples of the precursors were carbonized under the same conditions without addition of any carbon nanotubes.

Texture, Specific Surface Area and Porosity

The porous texture was characterized by nitrogen adsorption at 77 K and carbon dioxide adsorption at 273 K (AUTOSORB, Quantachrome). The nitrogen adsorption data were used to calculate the BET specific surface area $S_{BET}$. The differential functional theory (DFT) method was applied to the nitrogen adsorption isotherms to determine the pore size distribution in the micro- and mesopore region. The carbon dioxide adsorption isotherms at 273 K and low relative pressure $P/P_0<0.1$ are attributed to the adsorption in narrow micropores in the range of 0.4 to 0.7 nm (ultramicropores). They were used for the calculation of the ultramicropore volume and the ultramicropore surface according to the Dubinin-Radushkevich equation.

Figure 5A:
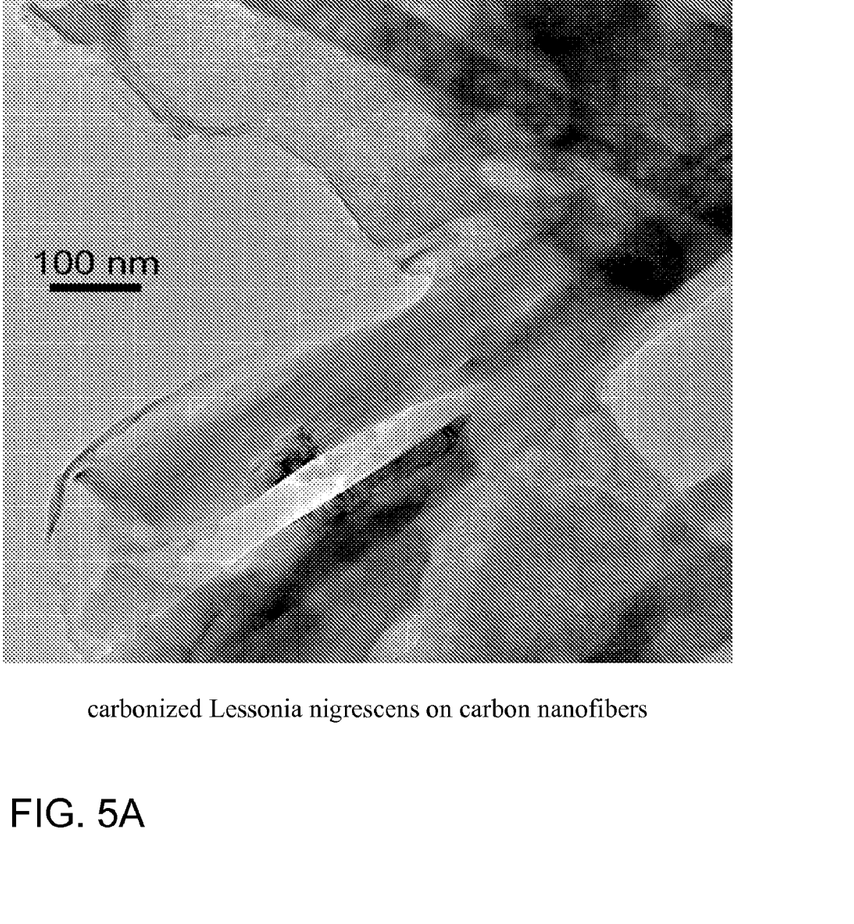
FIGS. 5A and 5B are TEM views of composites according to the invention.
Figure 5B:
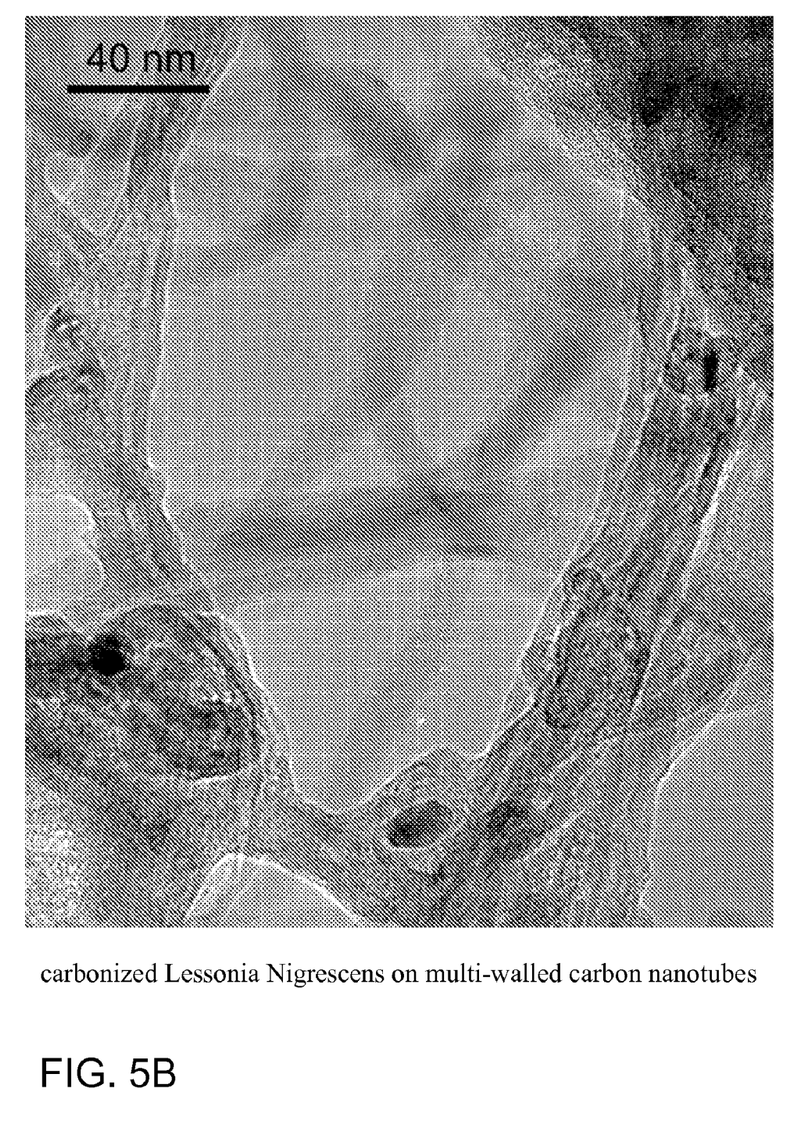

For comparison, pure multi-walled carbon nanotubes and pure carbon nanofibers were also studied. The obtained data are compiled in table 1.

nanofibers. However, the nanofibers have a bigger diameter and do not have the entanglement of the multi-walled carbon nanotubes, the composite has not such a mesoporous texture like that with multi-walled carbon nanotubes.

Heteroatom Content of the Composites

The oxygen content of the carbonized alginate and of the composites prepared with alginate as precursor was analyzed by XPS. The results are given in Table 2 below.

TABLE 2 oxygen content of carbonized alginate

| Sample | oxygen content atom % |
| --- | --- |
| Alginate | 15 |
| same with 5 wt % MWNTs | 11.5 |
| same with - 10 wt % MWNTs | 9 |
| MWNTs | 0 |

The decreasing oxygen content in the composites reflects the increasing fraction of multi-walled carbon nanotubes. Nevertheless, it is expected that it is still enough to generate a significant pseudocapacitive contribution to the overall capacitance.

In the cyclic voltammogram, the pseudocapacitive contribution lead to formation of humps or peaks. FIG. 1 shows a cyclic voltammogram of an electrode containing a composite of carbonized sodium alginate and a weight fraction of 10% multi-walled carbon nanotubes. For comparison, the cyclic

TABLE 1

Porous texture parameters of the composites

| Sample | $S_{BET}(N_2)$ m²/g | $S_{DR}(CO_2)$ m²/g | $V_{ultramicro}{}^a$ (d < 0.7 nm) cm³/g | $V_{micro}{}^b$ (0.7 < d < 2 nm) cm³/g | $V_{meso}{}^b$ (2 < d < 50 nm) cm³/g |
| --- | --- | --- | --- | --- | --- |
| Alginate | 270 | 497 | 0.20 | 0.09 | 0.07 |
| same with 5 wt % MWNTs | 412 | 621 | 0.24 | 0.02 | 0.30 |
| same with - 10 wt % MWNTs | 474 | 655 | 0.25 | 0.02 | 0.45 |
| Lessonia Nigrescens | 746 | 1001 | 0.38 | 0.07 | 0.30 |
| same with 5 wt % MWNTs | 693 | 1092 | 0.40 | 0.04 | 0.35 |
| same with 10 wt % MWNTs | 680 | 1077 | 0.41 | 0.03 | 0.42 |
| same with 10 wt % CNF | 664 | 935 | 0.6 | 0.05 | 0.25 |
| MWNTs | 326 | 77 | 0.03 | 0.01 | 1.36 |
| CNF | 32 | 0 | 0 | 0 | 0.01 |

$^a$obtained after applying the Dubinin-Radushkevich equation to the $CO_2$ adsorption data.
$^b$obtained after applying the DFT method to the $N_2$ adsorption data.

The data in Table 1 show that the presence of multi-walled carbon nanotubes, which are characterized by a high amount of mesopores, leads to an increase of the mesoporosity in the composites by comparison with the carbonized precursors without added carbon nanotubes. This effect was detected for both kinds of precursors, however it is more pronounced with a pure biopolymer as precursor by comparison with a raw seaweed as precursor. This difference can be explained by the partial consumption of the multi-walled carbon nanotubes during the carbonization in presence of catalytically active substances contained in the seaweeds.

In contrast carbon nanofibers, which themselves have a low porosity, have no significant effect of the porosity of the composite.

TEM pictures show in the case of multi-walled carbon nanotubes (FIG. 5A), the carbonized seaweed is covering the nanotubes and therefore, the composite has the mesoporous texture of the muti-walled nanotubes. In the case of carbon nanofibers (FIG. 5B), the carbonized seaweed is covering the voltammogram of an electrode containing carbonized alginate without added carbon nanotubes is also shown. Both cyclic voltamograms were recorded using three electrode technique with a scan rate of 2 mV/s with 1 mol/l $H_2SO_4$ as the electrolyte. Both cyclovoltametric traces show pronounced humps in the forward and backward direction, thus demonstrating that the pseudocapacitive behavior known for the carbonized biopolymers is also present in the composites.

Electrode and Capacitor Preparation

Electrodes pellets with an area of 1 cm² were obtained by pressing a mixture of the composite (90 wt %) together with a binder (PVDF, 10 wt %). For comparison purposes, electrodes were prepared by pressing carbonized alginate or carbonized Lessonia Nigrescens (85 wt %) together with 5 wt % carbon black and 10 wt % binder or by pressing carbonized alginate or carbonized Lessonia Nigrescens (90 wt %) together with 10 wt % binder.

Two-electrode sandwich type cells were built using a SWAGELOK construction, with a glassy fibrous separator between the pellets. The electrolyte used was 1 M $H_2SO_4$.

Electrical Conductivity

For two composites, the electronic conductivity of the composite material itself was determined by pressing a sample between two current collectors and measuring the resistance at high frequency (100 kHz).

For Lessonia Nigrescens with a weight fraction of 10% multi-walled carbon nanotubes a value of 0.9 S/cm was obtained, and for Lessonia Nigrescens with a weight fraction of 10% carbon nanofibers a value of 1.2 S/cm.

It might be reasonably assumed that composites made from pure biopolymers as precursors are even more conductive because of the higher purity such precursors.

Electrochemical Impedance Spectroscopy

Impedance spectroscopy measurements were performed on the capacitors at their rest potential. An AC amplitude of 20 mV was applied. The frequency range was 10,000 Hz to 0.001 Hz. The data obtained are the equivalent series resistance (ESR) related to the Ohmic resistances of the electrode material, the contacts and the electrolyte and the equivalent distributed resistance (EDR) related to the diffusion of ions into the charge-storing material.

The ESR corresponds to the high frequency limit (10 kHz) of the impedance.

The EDR is obtained by extrapolation of the nearly linear low frequency region of the Nyquist plot downwards to the real part axis and subtracting the ESR.

As can be seen in Table 3, both parameters, the electrical series resistance and the electrical diffusion resistance, decrease in the presence of multi-walled carbon nanotubes or carbon nanofibers. With sodium alginate as the precursor, a carbon nanotube fraction of 5% by weight already has a significant effect, whereas the increase of the carbon nanotube fraction to 10% by weight leads only to a moderate further decrease. In contrast, with raw seaweed as the precursor, a significant decrease of the electrical series resistance is achieved only with a carbon nanotube fraction of 10% by weight. This is probably caused by the partial consumption of the carbon nanotubes during carbonization of the seaweed.

The decrease of the electric series resistance is attributed to the electronic conductivity of the multi-walled carbon nanotubes, whereas the decrease of the electric diffusion resistance is attributed to the composite texture, which facilitates ion diffusion into and out of the electrode material. Especially for the composites containing multi-walled carbon nanotubes, it is assumed that the increased fraction of mesopores facilitates the diffusion of ions.

The presence of carbon black in a fraction of 5% by weight results in a nearly equal or lower decrease of the electric series resistance than the same weight fraction of multi-walled carbon nanotubes. However, the decrease of the electric diffusion resistance achieved by addition of carbon black was remarkably lower than with the same amount of multi-walled carbon nanotubes or carbon nanofibers.

TABLE 3

Electrical series resistance (ESR) and electrical diffusion resistance (EDR) obtained from impedance spectroscopy

| Sample | ESR (Ω) | DER (Ω) |
|---|---|---|
| Sodium Alginate | 1.53 | 1.7 |
| Sodium Alginate - 5 wt % Carbon Black | 0.46 | 0.9 |
| Sodium Alginate - 5 wt % MWNTs | 0.34 | 0.6 |
| Sodium Alginate - 10 wt % MWNTs | 0.31 | 0.5 |
| Lessonia Nigrescens | 0.38 | 1.4 |
| Lessonia Nigrescens - 5 wt % Carbon Black | 0.39 | 1.3 |
| Lessonia Nigrescens - 5 wt % MWNTs | 0.42 | 0.7 |
| Lessonia Nigrescens - 10 wt % MWNT | 0.31 | 0.5 |
| Lessonia Nigrescens - 10 wt % CNF | 0.35 | 0.72 |

Capacitive Behavior

The capacitance C was calculated from galvanostatic charge/discharge cyclic experiments according to the formula $$C = i * \frac{dt}{dE}$$

wherein i is the current density charging the electrode (per gram of electrode material), dE is the variation of the voltage during charging and dt is the time duration of charging. A current density i of 200 mA/g was applied in the galvanostatic cycling experiments, and the voltage E was cycled between 0 V and the reversible maximum charge/discharge voltage given in Table 4. The volumetric capacitance was obtained by multiplication of the gravimetric capacitance with the density of the electrode. The density was calculated from the mass of the electrode and the volume as defined by the geometric dimensions of the electrode.

The gravimetric energy density (amount of electrical energy E accumulated in a capacitor per mass unit of electrode material) was calculated according to the formula:

$$E = \frac{1}{2}CV^2$$

The gravimetric and volumetric capacitance, the gravimetric energy density and the maximum cycling voltage are given in table 4.

TABLE 4 results of the electrochemical characterizations

| Sample | density (g/cm$^3$) | Voltage (V) | C (F/g) | C (F/cm$^3$) | $E_{max}$ (Wh/kg) |
|---|---|---|---|---|---|
| Sodium Alginate | 0.91 | 1.0 | 198 | 180 | 7.4 |
| Sodium Alginate 5 wt % Carbon Black | 0.90 | 1.0 | 200 | 182 | 7.4 |
| Sodium Alginate 5 wt % MWNTs | 0.96 | 1.0 | 231 | 222 | 8.5 |
| Sodium Alginate 10 wt % MWNTs | 0.98 | 1.0 | 234 | 229 | 9.0 |
| Lessonia Nigrescens | 0.79 | 1.2 | 255 | 201 | 14.3 |
| Lessonia Nigrescens 5 wt % Carbon Black | 0.79 | 1.2 | 250 | 197 | 14.2 |

TABLE 4-continued results of the electrochemical characterizations

| Sample | density (g/cm³) | Voltage (V) | C (F/g) | C (F/cm³) | $E_{max}$ (Wh/kg) |
|---|---|---|---|---|---|
| Lessonia Nigrescens - 5 wt % MWNTs | 0.83 | 1.2 | 264 | 219 | 14.9 |
| Lessonia Nigrescens - 10 wt % MWNTs | 0.85 | 1.2 | 266 | 226 | 15.5 |
| Lessonia Nigrescens - 10 wt % CNF | 0.84 | 1.2 | 270 | 227 | 14.9 |
| MWNT 600° C. | | 0.6 | 18 | | 0.2 |
| Maxsorb | 0.47 | 0.7 | 180 | 85 | 3.4 |

The data in Table 4 show that the capacitance, which is already quite high in the carbonaceous materials without addition of carbon nanotubes, is further increased by the presence of carbon nanotubes. In contrast, the addition of carbon black does not result in a significant increase of the capacitance. For comparison, capacitance data of a capacitor with electrodes containing a state-of the art activated carbon (Maxsorb) are given. Its capacitance is significantly below that of the composites.

The maximum voltage, up to which reversible charge/discharge cycling of the capacitor is possible, is not affected by the presence of either carbon black or multi-walled carbon nanotubes. However, the maximum cycling voltage of both, the carbonaceous materials without added carbon nanotubes and the composites is much higher than the maximum cycling voltage of state of the art activated carbon like Maxsorb.

The energy density depends on the capacitance and on the maximum voltage. However, due to the proportionality with the square of voltage, the dependence on voltage is predominant. Since the maximum voltage did not change in the presence of carbon nanotubes, the energy density increases only slightly due to the increased capacitance in the presence of carbon nanotubes.

The dependence of the capacitance on the current density at which the capacitor is charged to/discharged from the maximum voltage is shown in FIGS. 2A and 2B. The presence of multi-walled carbon nanotubes significantly reduces the decrease of the capacitance with increased current density. With a pure biopolymer like alginate as precursor, a weight fraction of 5% multi-walled carbon nanotubes is sufficient to achieve a significant increase of the capacitance at high current densities, whereas an increase of the weight fraction of the multi-walled carbon nanotubes to 10% results only in a slight further improvement. In contrast, with raw seaweeds as the precursor, the improvement is much more pronounced in the presence of 10% by weight of multi-walled carbon nanotubes than with 5%. Again, this difference is attributed to the partial consumption of the carbon nanotubes during the carbonization of raw seaweeds.

This improvement is further reflected in the Ragone plots showing the available energy per unit mass of electrode material as a function of the gravimetric power density. Such plots are shown in FIGS. 3A and 3B. The energy extractable from the capacitor at high power density is higher with electrodes containing the composites than with electrodes containing only the carbonized precursor without carbon nanotubes.

The power P of an electrochemical capacitor is given by the equation $$P = \frac{V^2}{4 * R_s}$$

wherein $R_S$ is the internal resistance, which commonly corresponds to the equivalent series resistance (ESR) determined from impedance spectra. According to this equation, the power is increases when the electrical conductivity of the electrodes is increased.

Again, with a pure biopolymer like alginate as the precursor, a weight fraction of 5% multi-walled carbon nanotubes is sufficient to give a remarkable improvement, whereas a further increase of the weight fraction of multi-walled carbon nanotubes to 10% results only in a slight further improvement. In contrast with raw seaweed as the precursor, the improvement is much more pronounced in the presence of 10% by weight of multi-walled carbon nanotubes than with 5%. No improvement was obtained with carbon black in lieu of multi-walled carbon nanotubes.

Figure 4:
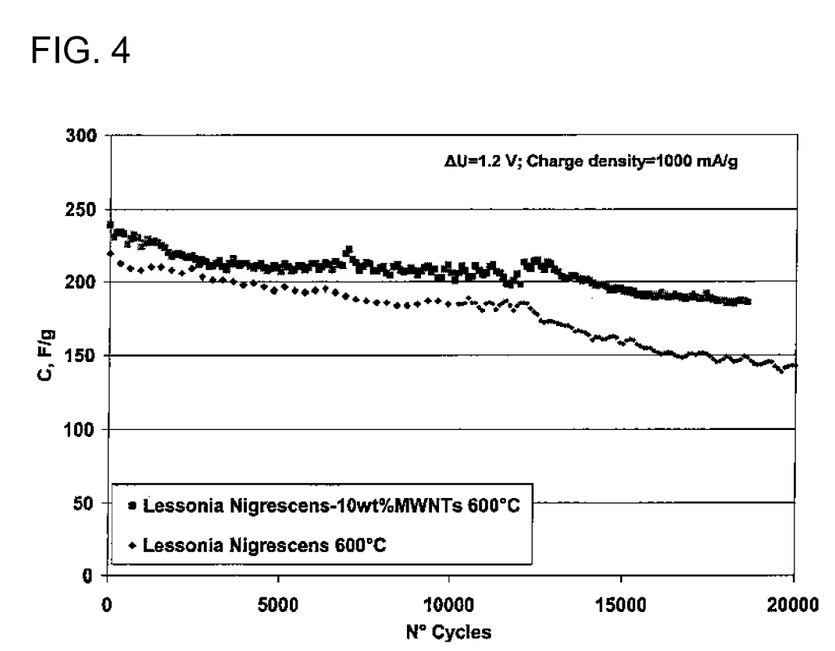
FIG. 4 is a graph showing a development of the capacitance during a large number of charging/discharging cycles.

During repeated cycling the decrease of the capacitance of the composites is smaller than for the carbonaceous material without carbon nanotubes. For example (FIG. 4), an electrode made from a composite containing carbonized Lessonia Nigerescens with a nominal weight fraction of 10% multi-walled carbon nanotubes, lost only around 20% of the initial capacitance after 20,000 cycles, while there was a loss of nearly 30% for the same carbonaceous material without added carbon nanotubes.

The invention claimed is:

1. A composite, comprising:
   carbon nanotubes; and
   a carbonaceous material, said carbonaceous material being a carbonization residue of one of a biopolymer and seaweed rich in heteroatoms, said carbonization residue being electrically conductive and having a heteroatom content as detected by XPS of at least 6%.

2. The composite according to claim 1, wherein said carbon nanotubes are selected from the group consisting of multi-walled carbon nanotubes, single-walled carbon nanotubes, carbon nanofibers and mixtures thereof.

3. The composite according to claim 1, wherein a weight fraction of said carbon nanotubes in the composite is at least 5%.

4. The composite according to claim 1, wherein said carbonization residue has an electrical conductivity of at least 0.2 S/cm.

5. The composite according to claim 1, wherein said carbonization residue has an oxygen content as detected by XPS technique being at least 6 atom %.

6. The composite according to claim 1, wherein a sum of contents of nitrogen and oxygen in said carbonization residue as detected by XPS is at least 8 atom %.

7. The composite according to claim 1, wherein said biopolymer is a biopolymer contained in seaweed.

8. The composite according to claim 7, wherein said biopolymer is selected from the group consisting of alginic acid, alginates, agar, iota-carrageenan, kappa-carrageenan and chitin.

9. The composite according to claim 1, wherein said seaweed is one of red seaweed, brown seaweed and agar rich seaweed.

10. The composite according to claim 1, wherein said seaweed is selected from the group consisting of Lessonia Nigrescens, Meristotheca Senegalensis and Hypnea Musciforme.

11. The composite according to claim 1, wherein said carbonaceous material is spread over a surface of said carbon nanotubes.

12. A process to obtain a composite, which comprises the steps of:
    homogeneously dispersing carbon nanotubes within one of a precursor biopolymer and seaweed, thus forming a precursor composite containing carbon nanotubes and one of a biopolymer and seaweed; and
    performing a carbonization of the precursor composite at a temperature in a range between 550 and 1000° C. under an inert atmosphere without any activation treatment.

13. The process according to claim 12, which further comprises selecting the carbon nanotubes from the group consisting of multi-walled carbon nanotubes, single-walled carbon nanotubes, carbon nanofibers and mixtures thereof.

14. The process according to claim 13, which further comprises performing the carbonization step at a temperature below a highest temperature level of thermally induced weight loss of one of the biopolymer and the seaweed detected by thermogravimetric analysis.

15. The process according to claim 12, which further comprises selecting the biopolymer to be a biopolymer contained in seaweed.

16. The process according to claim 15, which further comprises selecting the biopolymer from the group consisting of alginic acid, alginates, agar, iota-carrageenan, kappa-carrageenan and chitin.

17. The process according to claim 12, which further comprises selecting the seaweed from the group consisting of red seaweed, brown seaweed and agar rich seaweed.

18. The process according to claim 12, which further comprises selecting the seaweed from the group consisting of Lessonia Nigrescens, Meristotheca Senegalensis and Hypnea Musciforme.

19. The process according to claim 12, which further comprises performing the carbonization of the precursor composite at a temperature in a range between 600 and 900° C.

20. An electrode for an electrochemical capacitor, the electrode comprising:
    a charge-storing material having carbon nanotubes and a carbonaceous material, said carbonaceous material being a carbonization residue of one of a biopolymer and seaweed rich in heteroatoms, said carbonization residue being electrically conductive and having a heteroatom content as detected by XPS of at least 6%; and
    a binder.

21. The electrode according to claim 20, further comprising an aqueous electrolyte, gravimetric capacitance of at least 230 F/g being obtained at a galvanostatic current of 0.2 A/g in a voltage range between 0 V and a maximum reversible charge/discharge voltage.

22. The electrode according to claim 20, further comprising an aqueous electrolyte, a volumetric capacitance of at least 220 F/cm$^3$ being obtained at a galvanostatic current of 0.2 A/g in a voltage range between 0 V and a maximum reversible charge/discharge voltage.

23. The electrode according to claim 20, further comprising a conductive auxiliary agent.

24. An electrochemical capacitor, comprising:
    two electrodes each having a charge-storing material, a binder, and a conductive auxiliary agent, said charge storing material of at least one of said electrodes having carbon nanotubes and a carbonaceous material, said carbonaceous material being a carbonization residue of one of a biopolymer and seaweed rich in heteroatoms, said carbonization residue being electrically conductive and having a heteroatom content as detected by XPS of at least 6%; and
    an electrolyte selected from the group consisting of aqueous electrolytes and organic electrolytes.

25. The electrochemical capacitor according to claim 24, wherein said charge-storing material of both of said electrodes contains said carbon nanotubes and said carbonaceous material, said carbonaceous material being said carbonization residue of one of said biopolymer and said seaweed rich in said heteroatoms, said carbonization residue being electrically conductive and having said heteroatom content as detected by XPS of at least 6%.

* * * * *